INVENTOR
Francis A. Scheda

Sept. 30, 1969　　　　F. A. SCHEDA　　　　3,470,409
CONCENTRIC COIL STATOR WINDING FOR POLYPHASE
DYNAMOELECTRIC MACHINE
Filed May 28, 1968　　　　　　　　　　2 Sheets-Sheet 2
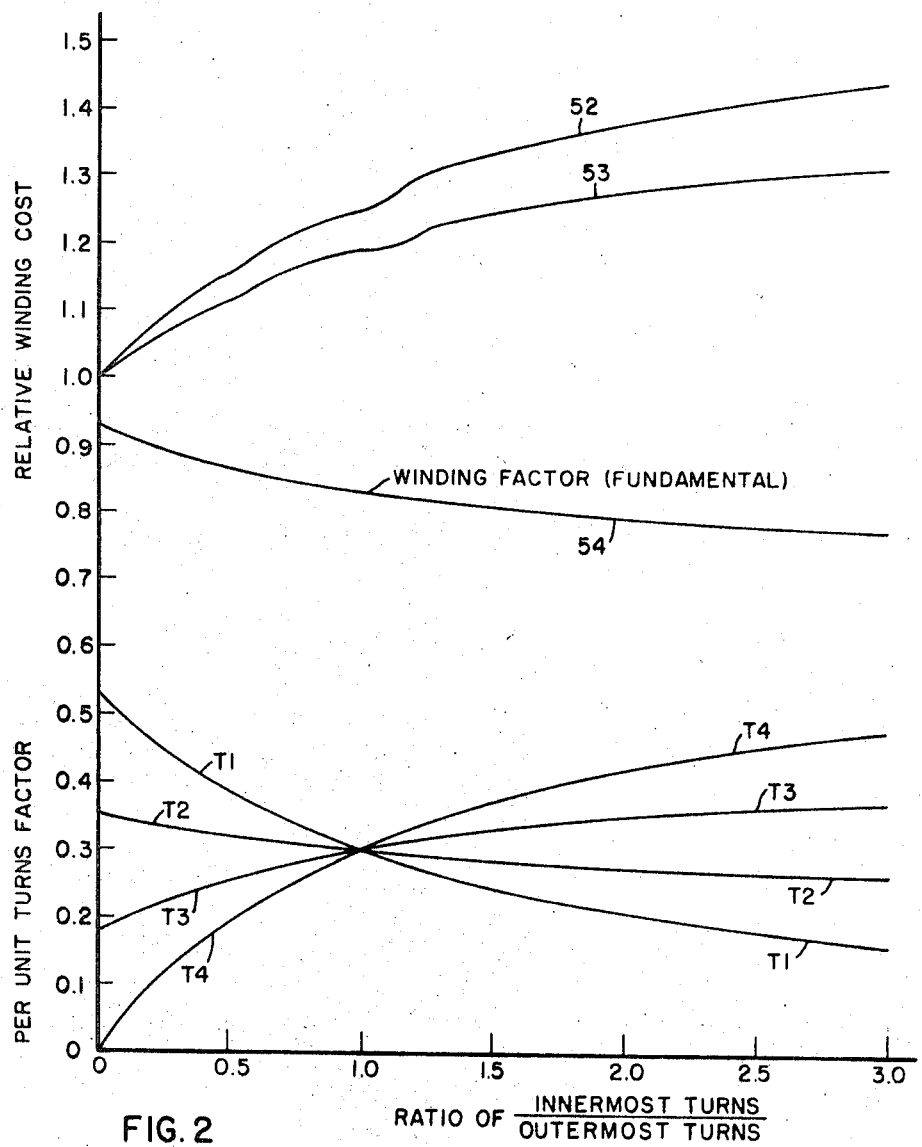
FIG. 2
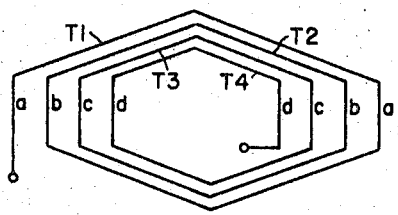
FIG. 3
FIG. 4
| | CORE SLOTS | | | |
|---|---|---|---|---|
| COIL SIDES | a | b | c | d |
| | d | c | b | a |
FIG. 5
| | CORE SLOTS | | | |
|---|---|---|---|---|
| COIL SIDES | d | c | b | a |
| | a | b | c | d |

United States Patent Office 3,470,409
Patented Sept. 30, 1969

3,470,409
CONCENTRIC COIL STATOR WINDING FOR POLYPHASE DYNAMOELECTRIC MACHINE
Francis A. Scheda, Williamsville, N.Y., assignor to Westinghouse Electric Corporation, Pittsburgh, Pa., a corporation of Pennsylvania
Filed May 28, 1968, Ser. No. 732,610
Int. Cl. H02k *19/06*
U.S. Cl. 310—180                              3 Claims

ABSTRACT OF THE DISCLOSURE

A polyphase stator winding for a dynamoelectric machine, the winding disposed in slots of a stator core comprising a plurality of coil groups forming a plurality of magnetic poles with each coil group having innermost and outermost concentric coils. The coils have coil sides adapted to lie in different slots, the ratio of the turns of the innermost coils to the turns of the outermost coils being such that the coils are distributed about the core to effect substantially equal slot fullness in all of the core slots.

BACKGROUND OF THE INVENTION

The invention relates generally to dynamoelectric machines and particularly to machines and induction motors having a concentric coil winding providing maximum economy and improved machine performance.

In the manufacture of dynamoelectric machines, such as polyphase induction motors and particularly the commercially common three-phase induction motors, it is desirable that the winding of the primary core member or stator be so arranged as substantially to produce a spatial sinusoidal M.M.F. wave while simultaneously providing electric balance in reactance and resistance among the phase circuits of the winding. Although these end results in most cases can satisfactorily be achieved through the use of a lap winding, with some sacrifice in motor performance, substantial manual labor and corresponding manufacturing expense are required for placement of a lap winding in a machine. On the other hand, a concentric coil winding can be formed substantially by machine rather than manual labor, but difficulties are ordinarily encountered in placing the coil sides of the concentric coil winding so as to achieve the electrical balance among the phase circuits of the winding.

In order to effect a certain economy, some motors have been wound using a single coil for each phase pole and others have been provided with only half as many coils as there are slots provided in the stator core. While such arrangements provide an increase in economy by using less wire, they usually result in the generation of excessive spatial harmonics in machine M.M.F., and they often do not provide full utilization of all the stator slots, both of which adversely affect machine performance and operation. Further, the use of less wire generally results in an increase in electrical resistance and thus a decrease in machine efficiency.

BRIEF SUMMARY OF THE INVENTION

Briefly, the invention provides an economical, full slot, stator core winding having innermost and outermost coils or coil turns, the cost of the winding being a function of the ratio of the innermost turns to the outermost turns, the cost per unit of electrical resistance being minimum when said ratio is zero. This is based on the actual cost of the wire comprising the coils, insulated copper wire for example, through the invention is not limited thereto, and a per coil unit turns factor for effecting full slot utilization when the number of turns of wire forming the innermost coil is zero. This allows the use of coil groups having concentric outer and inner coils disposed in the slots of a stator core to form groups of phase poles in which the turns or wire comprising the outermost coil of each coil unit fill the slots which they alone occupy. The next adjacent slot is commonly occupied by turns of wire forming the inner coil of the first mentioned coil unit and an adjacent coil unit of a different phase and pole, the combined inner turns of wire being equal in number to the outermost turns of wire thereby filling the adjacent slot.

With the present invention, when the ratio of the number of stator core slots to the product of the numbers of the phases and poles is an integral number, the number of concentric coils required to fill the slots will be one less than said integral number.

Thus, with the above briefly described winding arrangement, a maximum cost saving is effected while simultaneously providing full core slots, an electrical and magnetic balance among the phases without spatial harmonics, and the use of identical concentric coil groups which allows the use of automatic coil inserting machinery, thereby achieving manufacturing facility and economy.

THE DRAWING

The invention, including the objects and advantages thereof, will be better understood from the following detailed description read in connection with the accompanying drawing in which:

FIG. 2 is a graph showing the relative cost of the winding as a function of the ratio of innermost coil turns to outermost coil turns, and a per unit turns factor scale for effecting full slot utilization when said ratio is equal to zero;

FIG. 3 is a schematic view of a single concentric coil unit employed in the core of FIG. 1; and FIGS. 4 and 5 are tables showing the coil side locations in the stator slots.

PREFERRED EMBODIMENT

Figure 1:
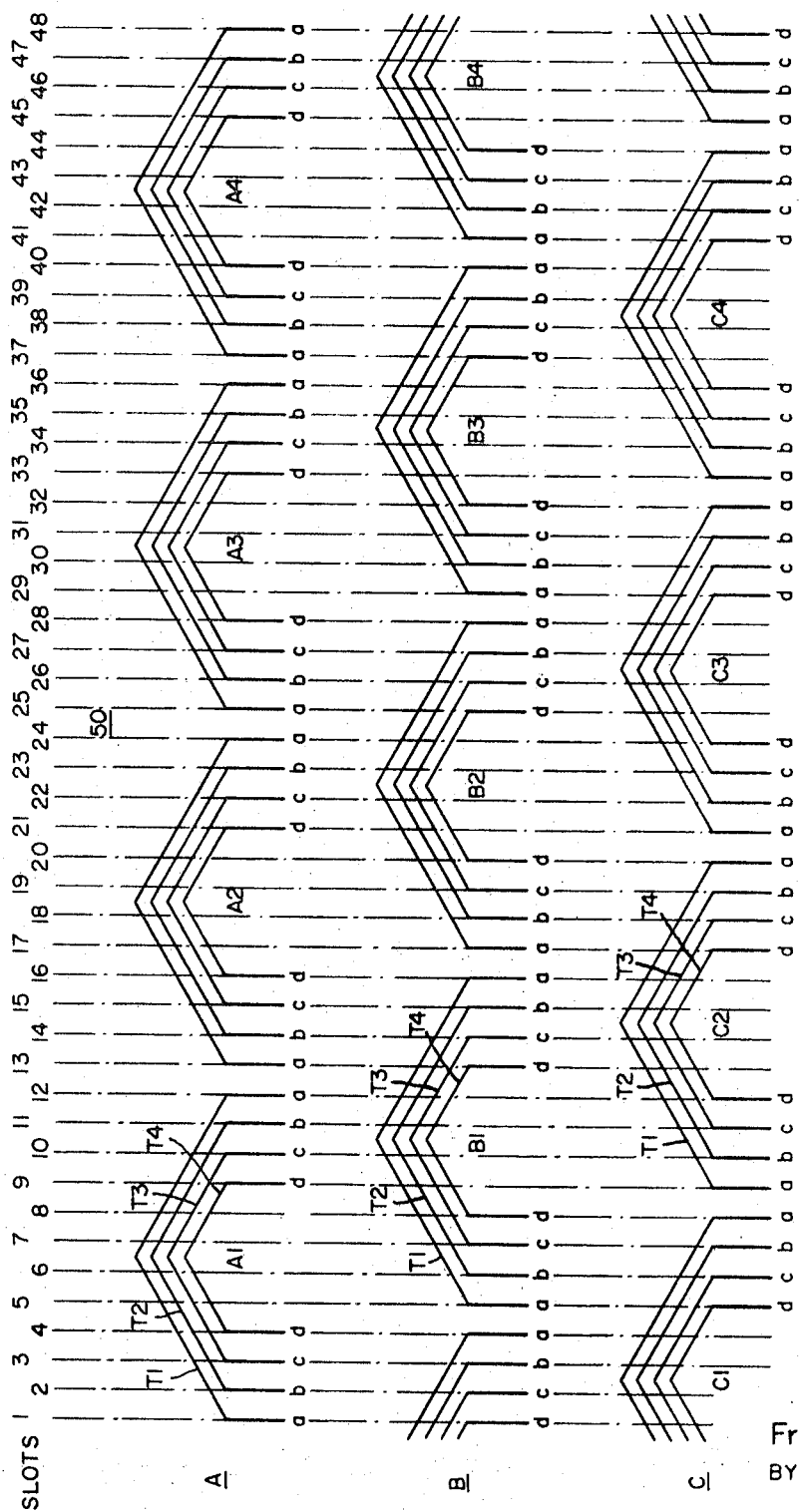
FIGURE 1 is a schematic developed view of the manner in which concentric coil units may be disposed in the slots of a stator core.

Specifically, there is shown in FIG. 1 of the drawing a diagrammatic view of a stator core 50 developed in a manner to show representatively forty-eight slots indicated by dot-dash vertical lines 1 to 48 inclusive. In the slots are disposed sides (represented by short, vertical lines *a* to *d*) of four coils T1 to T4 which form overlapping coil groups numbered A1 to A4, B1 to B4, and C1 to C4, the coil groups forming a like number of magnetic poles, when energized, in the core 50. Thus, the core and stator winding depicted in FIG. 1 is for a four pole, three phase machine having a suitable rotor (not shown) and a suitable frame (not shown) on which the stator core and rotor are mounted.

For reasons which will be more apparent hereinafter, the two sides of each coil are labeled with a common indicator, namely, a common lower case letter. Thus, for example, the outermost coil T1 of group A1 has two sides *a* lying respectively in slots 1 and 12 of the core 50 while two sides *d* of innermost coils T4 are shown respectively in slots 4 and 9.

The coils A1 through C4 may be referred to as coil groups or pole groups, the four concentric coils T1 to T4 being connected together in the manner shown in FIG. 3. The coil groups may, in turn, be connected together in series or in parallel, with alternating polarity, and then connected to a three-phase source of energy (not shown) to provide the three phase circuits A, B and C shown in FIG. 1. In FIG. 1, the lower half of the concentric coil turns, and the connections between coil groups are omitted for purposes of clarity, as any suitable winding connection may be used.

Each of the four coils T1 to T4 represent schematically concentric turns of insulated wire, enameled copper wire for example, chosen to fill the slots 1 to 48 in the core 50 in a novel manner presently to be explained.

In the embodiment of the invention shown in the figures, which includes a forty-eight slot stator core, the outer concentric coil T1 of each of the coil groups A1 to C4 is sized to span twelve stator slots in accordance with the usual formula:

$$\frac{S}{P} - 1$$

where S equals the number of slots and P equals the number of poles. Thus, for the concentric coil group A1, the respective sides $a$ of the outermost coil T1 are disposed in slots 1 and 12 of the stator 50. Concentrically within the outermost coil, there is provided inner coils T2 and T3 with their sides $b$ and $c$ disposed respectively in slots 2 and 11, and slots 3 and 10 of the core. The innermost coil T4, as shown in FIG. 1, has two sides $d$ located respectively in slots 4 and 9 of the core. The coil T4, however, is shown only for the purpose of illustrating the invention since it may be eliminated to effect a considerable savings in the cost of a stator winding in a manner presently to be explained.

In viewing the winding arrangement of FIG. 1 it will be seen that the sides of the concentric turns of a coil group of a first phase occupy slots in the core 50 in common with the sides of an adjacent coil group of different phases. For example, coil group B1 has its left coil sides $a$ to $d$ occupying respectively core slots 5 to 8 together with the right coil sides $d$ to $a$ of coil group C1; similarly, the right coil sides $d$ to $a$ of B1 occupy respectively slots 13 to 16 together with the left coil sides $a$ to $d$ of coil group A2. This pattern is consistent throughout the core so that the outermost and innermost coil sides $a$ and $d$ respectively of adjacent poles of different phases always occupy the same slots, while the two inner sides $b$ and $c$ of adjacent but different phase poles occupy the same slots. Thus, the coil side pattern for a four coil concentric coil group in a 48-slot core is as depicted in FIGS. 4 and 5, said figures showing the reverse order of the sides in the slots. This is seen also in FIG. 1 as one moves laterally along the core 50, the sides of the coils of different phases occupying slots commonly in the first and second orders shown in FIGS. 4 and 5. In either order, the outermost and innermost coil sides $a$ and $d$ always occupy the same slots. Similarly, the inner coil sides $b$ and $c$ occupy the same slots.

The cost of a machine may be reduced by using less wire, but as well known, with the use of less wire, electrical resistance is generally substantially increased with a consequent decrease in the efficiency of the machine. It is desirable therefore to reduce the cost of machine wire without a consequent increase in units of electrical resistance so that economies can be effected without adversely affecting machine efficiency.

In accordance with the invention, it has been found that the cost per unit of electrical resistance of the insulated wire for forming the turns of the coil groups A1 to C4 is directly dependent upon the ratio of the turns of the innermost coil to the turns of the outermost coil, the cost being minimum when the ratio is zero. The relationship of the winding cost to said ratio is illustrated by curves 52 and 53 in the graph of FIG. 2. The curve 52 represents the cost analysis of an eight inch stator core while the curve 53 represents that of a three inch stator core.

The winding factor (i.e., the ratio of effective turns to actual turns of wire) for the stator winding as thus far described is shown by curve 54 in FIG. 2. As is well known, the lowest cost winding (per unit of electrical resistance) is one having the shortest possible turn with the highest winding factor.

In the lower portion of the graph of FIG. 2 is shown a per unit turns factor for each of the four concentric coils T1 to T4 plotted against the ratio of the turns of the innermost coil T4 to the turns of the outermost coil T1. The turns factor for each coil can be expressed as a function of the winding factor and the ratio of the innermost coil turns to the outermost coil turns. These functions are plotted in FIG. 2. As previously shown, when the number of turns of wire forming the innermost turn T4 is zero, the cost of the stator winding is minimum. When the innermost coils T4 are thus eliminated, the ordinate of the graph shows a turns factor scale for determining the number of turns of wire to fill the slots of a stator core using only the remaining three coils T1, T2 and T3.

As shown in FIGS. 1, 4 and 5, with the elimination of the innermost coils T4, the sides of the coils T1 occupy their slots alone while the sides $b$ and $c$ of the coils T2 and T3 continue to occupy their slots jointly. Thus, in using the turns factor scale given in FIG. 1, fifty-three turns of wire, for example, may fill the slots of a core to form an outer coil T1, while T2 and T3 would then require thirty-five and eighteen turns, respectively, to fill the slots they jointly occupy, thirty-five and eighteen equaling fifty-three so that all slots are equally filled. Thus, the ratio of the wire turns for effecting equal slot fullness is fifty-three to thirty-five to eighteen.

In this manner, all the core slots are filled equally with the fourth coil T4 eliminated thereby effecting a maximum savings in wire and wire cost without adversely affecting the performance of the machine. Thus, in the embodiment shown, only three coils per coil unit or group are needed to fill the slots of a stator core otherwise requiring four coils per group. The actual number of wire turns in each coil required to fill a core slot will depend of course on such design parameters as slot dimensions and wire size, the proportionate number of turns for each concentric coil being ascertainable from the turns factor scale shown in FIG. 2.

The savings in wire is considerable. For example, in a machine ordinarily requiring six pounds of wire for a conventional winding, two pounds of copper wire can be eliminated by using the inventive principles described above.

As indicated by FIG. 1, the coil groups A1 to C4 are evenly spaced in the core 50 to produce a spatial sinusoidal M.M.F., and as shown in FIG. 2, a wire turns factor scale is given providing equal slot fullness by the elimination of the innermost coil or turn T4, thereby providing full and efficient use of the stator core while simultaneously providing a balance in reactance and resistance among the phase circuits.

Further the remaining coils T1 to T3, being concentric with each other and identical for each phase and pole, allows the use of automatic machinery for winding and inserting the coil groups thereby effecting further savings in the cost of the machine using the winding principles of the invention. Thus, when the ratio of the number of core slots to the product of the pole and phase numbers is an integral number, the number of concentric coils required to fill the slot will be one less than said integral number. In the embodiment shown and described, the integral number is four and the number of concentric coils (T1 to T3) is three.

Though the invention has been described with a certain degree of particularity it should be understood that changes can be made therein without departing from the spirit and scope thereof. For example, the invention is not limited to a 48-slot stator core as shown in FIG. 1.

What is claimed is:

1. In a dynamoelectric machine having a predetermined number of poles and phases, and a stator core having a predetermined number of slots provided therein, the ratio of said number of slots to the product of said pole and phase numbers being an integral number, a polyphase stator winding comprising
a plurality of identical coil groups forming a like plurality of magnetic poles for each phase,
each of said coil groups being formed by a number of concentric coils with each coil being made from a plurality of turns of insulated wire having sides adapted to lie in said slots.
a number of concentric coils being one less than said integral number and including at least one outer coil and at least one inner coil,
the sides of said turns of wire of the outer coil alone filling the core slots in which they are disposed, and
the sides of said turns of wire forming the inner coils of adjacent poles of different phases being disposed together in slots adjacent those filled by the outer coil to fill said adjacent slots and thereby effect equal slot fullness in all of said slots.

2. The machine described in claim 1 in which the stator winding is a three phase winding and the stator core has forty-eight slots,
the coil groups forming four poles for each phase with each group having three coils with sides disposed in said slots,
the sides of the outermost coil of each phase-pole disposed alone in predetermined ones of said slots, the outer-most coil sides along filling said slots,
the sides of the remaining inner coils of adjacent but different phase-poles disposed together in the remainder of said slots, the inner coil sides together filling the remainder of said slots.

3. The machine described in claim 1 in which the stator winding is a three phase winding and the stator core has forty-eight slots,
the coil groups forming four poles for each phase with each group having three coils,
said coils being formed by a number of turns of insulated wire, the ratio of said number of turns being fifty-three to thirty-five to eighteen.

References Cited

UNITED STATES PATENTS

| | | | |
|---|---|---|---|
| 1,488,873 | 4/1924 | Francis | 310—180 |
| 3,321,653 | 5/1967 | Sonoyama | 310—180 |
| 3,324,322 | 6/1967 | Johns | 310—198 |
| 3,335,307 | 8/1967 | Levy | 310—202 |
| 3,348,084 | 10/1967 | Jordan | 310—202 |

WARREN E. RAY, Primary Examiner

U.S. Cl. X.R.

310—166, 202